Aug. 2, 1955

J. D. GLEESON 2,714,291

SELECTOR VALVE FOR CONVERTING HYDRAULIC SYSTEM
FROM SINGLE-ACTING TO DOUBLE-ACTING

Filed Dec. 4, 1953

INVENTOR.
J. D. GLEESON

ATTORNEYS

Aug. 2, 1955 J. D. GLEESON 2,714,291
SELECTOR VALVE FOR CONVERTING HYDRAULIC SYSTEM
FROM SINGLE-ACTING TO DOUBLE-ACTING
Filed Dec. 4, 1953 2 Sheets-Sheet 2

INVENTOR.
J. D. GLEESON

ATTORNEYS

United States Patent Office 2,714,291
Patented Aug. 2, 1955

2,714,291

SELECTOR VALVE FOR CONVERTING HYDRAULIC SYSTEM FROM SINGLE-ACTING TO DOUBLE-ACTING

John D. Gleeson, Waterloo, Iowa, assignor to Deere Manufacturing Co., Dubuque, Iowa, a corporation of Iowa Application December 4, 1953, Serial No. 396,240

10 Claims. (Cl. 60—97)

This invention relates to a hydraulic power lift system for an agricultural tractor and more particularly to a selector valve arrangement for converting the system from a single-acting system to a double-acting system. The design according to the present invention finds particular utility in a hydraulic power control system of the general type shown in U. S. Patent 2,532,552, wherein is disclosed a system forming somewhat of an integral part of an agricultural tractor and comprising essentially a built-in single-acting motor in the form of a cylinder and piston and a power control housing containing a two-way control valve for controlling the operation of the single-acting motor as well as the operation of a remotely associated, double-acting motor selectively connectible to the power control housing by special couplings and adapters. According to that form of design, a pair of motor outlets for flexible hose connection to the remote cylinder could be closed by removable plugs so that operation of the system would be confined to the single-acting or built-in motor. However, the plugs could be removed and be replaced by a pair of couplings that have the dual function of connecting the remote cylinder hoses and of disconnecting the system from the integral cylinder.

In the use of towed agricultural implements with tractors equipped with a power control system of the general character referred to, there is ever present the problem of disconnection of the implement from the tractor, whether intentional or accidental. In the event of intentional disconnection, the hose couplings to the remote cylinder must be disconnected and be replaced by the plugs as referred to above. When accidental disconnection occurs, the hose lines are subjected to extreme tensional forces and in order that damage may be avoided, the couplings are preferably of the breakaway type. More recently, however, the tendency is to utilize breakaway couplings of the self-sealing type which close automatically to prevent loss of hydraulic fluid from the control valve housing as well as from the hoses in the event of either intentional or accidental disconnection. The trend to the use of couplings of the last-mentioned type referred to above has made it difficult to adapt such couplings to older tractors equipped with a power control system of the patented type heretofore mentioned, primarily because it is somewhat difficult to adapt self-sealing couplings to replace the plugs that must be removed in order that the system may be converted from a single-acting system to a double-acting system. According to the present invention, this problem is solved by the expedient of providing the control system with an additional pair of motor outlets for the remote cylinder, motor connections for those outlets and a pair of additional plugs for respectively plugging up the motor outlets formerly used, one of the additional plugs including a selector valve that is adjustable for conversion purposes. The invention therefore accomplishes a novel result as an expedient in converting older type systems for use with the newer type couplings and is particularly significant in the relatively few changes required in the basic system. It is therefore another object of the invention to accomplish the conversion by means that are relatively inexpensive to manufacture and that may be readily installed by the user in the field.

The foregoing and other important objects and desirable features inherent in and encompassed by the invention will become apparent as a preferred embodiment of the invention is disclosed in detail in the following specification and accompanying sheets of drawings, the several figures of which are described immediately below.

Fig. 1 is a fragmentary perspective view of the rear portion of a tractor equipped with a power control system and embodying the invention.

Fig. 2 is a combined sectional and schematic view illustrating the circuits involved for the double-acting motor and the single-acting motor, the left-hand portion of the view representing a section through the housing as seen substantially along the line A—A of Fig. 1 and the right-hand portion representing a section through the housing as seen substantially along the line B—B of Fig. 1, the two views being schematically interconnected to facilitate an understanding of the circuits.

Figure 1:
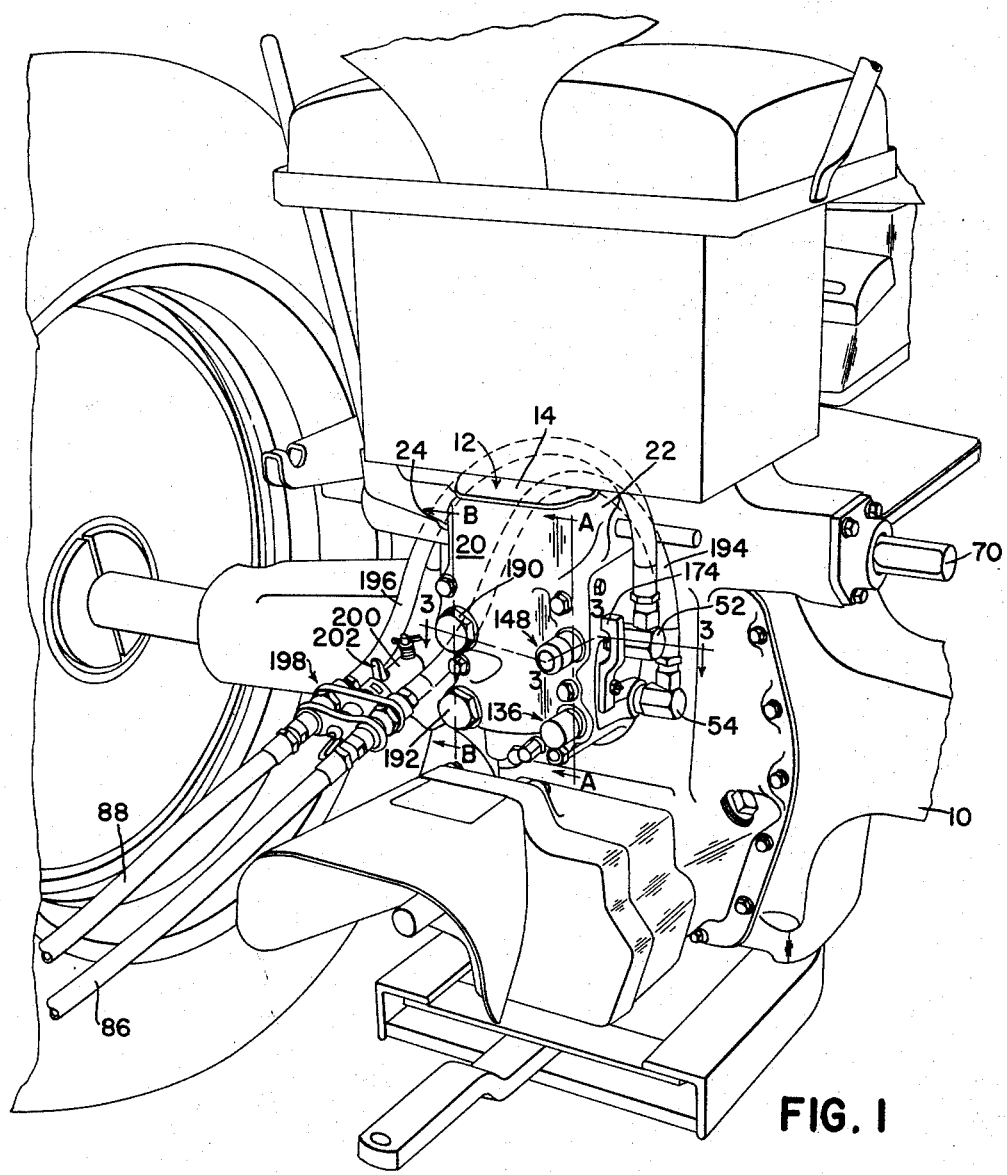

A popular type of agricultural tractor will be recognized in Fig. 1 as having a transverse rear axle structure 10 carrying at its rear a main control valve housing designated generally by the numeral 12. This housing has a top 14, a bottom 16 and front and rear and opposite sides 18, 20, 22 and 24 respectively. The details of the external portions of the housing and the manner of mounting it on the axle structure 10 are without significance here, since they may be of any type.

The housing 12 has a fluid-pressure supply inlet 26 opening to a vertical valve bore 28 in which a main control valve 30 is axially shiftable. The housing further has upper front and rear chambers 32 and 34 respectively and lower front and rear chambers 36 and 38 respectively. The upper chambers are intersected by a fore-and-aft extending bore 40 that opens at the rear face 20 of the housing as at 42. A lower fore-and-aft extending bore 44 intersects the lower chambers 36 and 38 and opens at the rear of the housing as at 46.

Figure 2:
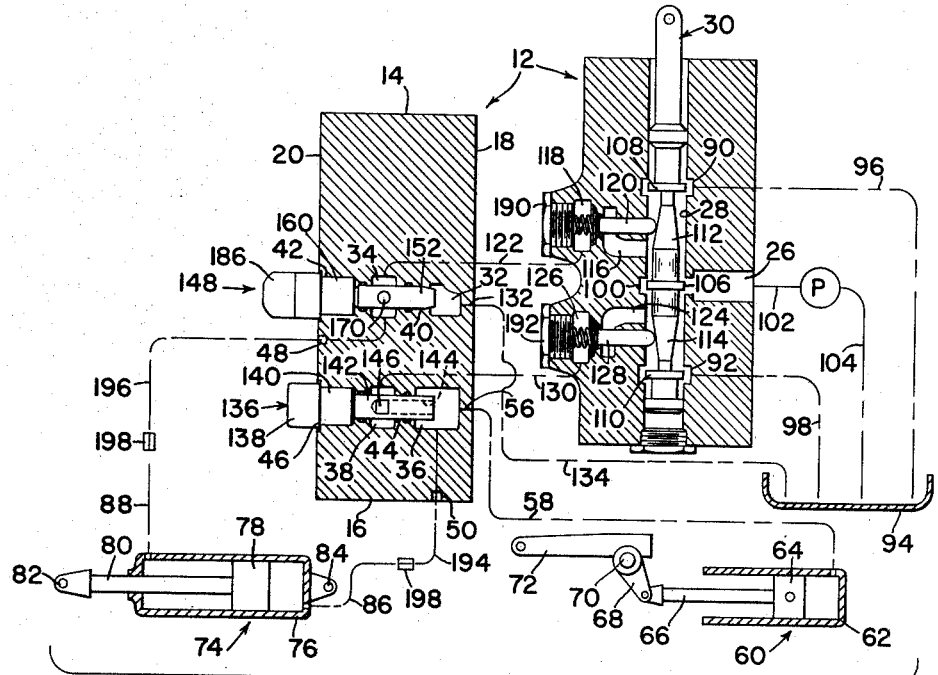
Figure 4:
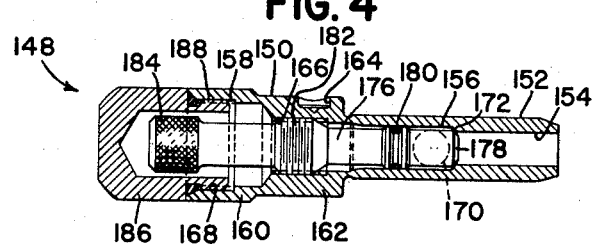
Fig. 4 is a longitudinal sectional view through the selector valve, with the inner valve member in its closed position.
Figure 3:
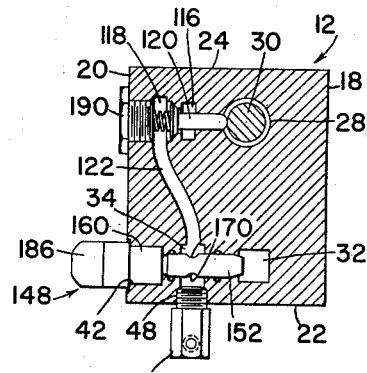
Fig. 3 is a transverse sectional view as seen substantially along the line 3—3 of Fig. 1.
Figure 5:
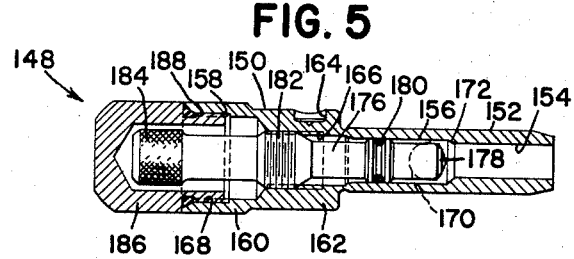
Fig. 5 is a similar view showing the open position of the inner valve member.

As best shown in Fig. 3, the housing is provided at its side 22 with a first motor outlet 48 that is communicated with the upper rear chamber 34. The motor outlet 48 is indicated schematically in Fig. 2 as opening at the rear of the housing 12, but it should be understood that the actual structure is as shown in Fig. 3, the schematic violation being merely for the purposes of convenience of illustration. The housing also has at its side 22 a second motor port 50, shown only schematically in Fig. 2. However, the presence of the two motor ports and their relationship to each other at the side 22 of the housing may be appreciated from the illustration of upper and lower fittings 52 and 54 in Fig. 1.

The housing 12 has additionally a third motor outlet 56 opening internally of the housing at the front side thereof (see the above-noted patent) and connected by a fluid-transmitting passage 58 to a single-acting motor, designated generally by the numeral 60. This motor, as explained in the above-noted patent, is preferably built into the tractor and is commonly known as an integral or rockshaft cylinder. It comprises a cylinder 62 and a piston 64, the piston having a piston rod 66 connected to an arm 68 on a transverse rockshaft 70 mounted at the rear of the tractor and including one or more lift arms such as that shown at 72 for adjusting the positions of the various types of implements that can be mounted on the tractor. In a construction of the type illustrated here and as patented, the passage 58 is also built into the unit and permanently connects the lower front chamber 36 with the single-acting or one-way motor 60. The outlets 48 and 50 are present but not used in the earlier construction but are utilized according to the present invention.

The tractor is frequently used with towed or trail-behind implements having adjustable parts that cannot be conveniently powered by the motor 60. Accordingly, it is conventional to include with such implements, as either standard or accessory equipment, a remote cylinder of the double-acting type. Such a cylinder is indicated schematically in Fig. 2 and is designated generally by the reference character 74. This motor includes a cylinder 76 and a piston 78, the piston having a piston rod 80 which may be conveniently connected by a clevis 82 to one of a pair of relatively movable parts on the implement. The other end of the cylinder has a similar clevis 84 for anchoring the motor to another of such relatively movable parts. It is known, of course, as has already been indicated herein, to connect a motor, such as the motor 74, to a basic system by means of relatively long hoses or equivalent fluid-transmitting conduits 86 and 88. According to the patented structure, these hoses are connectible respectively to the lower and upper valve housing bores 44 and 40. According to the already patented design, these hoses were optionally connectible by couplings that replace normally present plugs. In other words, the system, when used solely with the motor 60, would have the openings 42 and 46 blocked so that the fluid circuit was directly to and from the motor 60 via the chambers 38 and 36, front motor outlet 56 and passage 58, it being recalled from the previous explanation that the motor ports 48 and 50 are absent in the earlier system.

According to the present invention, the earlier system is modified to the extent described in detail below. For the moment, however, it is deemed appropriate to complete the description of the valve housing 12 and the main control valve 30, so far as concerns the control of the circuit to the chambers 32, 34, 36 and 38.

The main control valve bore 28 has upper and lower annular reservoir grooves 90 and 92 connected respectively to a reservoir 94 by reservoir passages 96 and 98. A central high-pressure annular groove 100 communicates with the inlet 26 and the inlet is connected by a line 102 to the high-pressure side of a pump P, the low-pressure side of which is connected by a line 104 to the reservoir 94.

The control valve 30 is preferably of the spool type having an annular central portion 106, annular portions 108 and 110 spaced axially respectively above and below the portion 106 and tapered portions 112 and 114 respectively between the portions 106 and 108 and 106 and 110. When the main control valve 30 is in the neutral position shown, the annular portions or rings 106, 108 and 110 are substantially centered respectively in their grooves 100, 90 and 92 so that fluid circulates from the reservoir, through the pump, through the valve housing and back to the reservoir at no appreciable pressure.

The housing bore 28 is provided intermediate the high-pressure groove 100 and upper reservoir groove 90 with a check valve passage 116 which is normally cut off from a check valve chamber 118 by an upper spring-loaded check valve 120. The check valve chamber 118 is in permanent communication via a passage 122 with the upper rear chamber 34, the actual as distinguished from the schematic structure of which may be seen in Fig. 3. A lower check valve passage 124 opens to the valve bore 28 intermediate the high-pressure portion 106 and lower reservoir portion 110 and is normally cut off from a lower check valve chamber 126 by means of a lower spring-loaded check valve 128. The check valve chamber 126 is in permanent communication with the lower rear chamber 38 via at passage 130, the actual structure of which is similar to the actual structure shown in Fig. 3 as respects the upper chambers 118 and 34 and the upper passage 132. Vertical movement of the control valve 30 in either direction from its neutral position controls the transmission of fluid under pressure as well as returning fluid.

Before leaving the description of the control valve 30 and its relationship to the various passages, it should be noted that the upper front chamber 32 has a reservoir outlet 132 connected by a fluid line 134 with the reservoir 94. Preferably, the outlet 132 and line 134 are permanent or built in, in a system following the basic principles of the patented arrangement previously noted.

The lower bore 44 in the valve housing 12 (the bore that intersects the chambers 36 and 38) normally carries a first removable means that will be hereinafter referred to as a plug and designated generally by the numeral 136. This plug has a rear end portion 138 of such size and disposition relative to the housing 12 as to be readily manipulated for removal and installation. The plug has an internal adjacent portion 140 of somewhat reduced diameter from which extends an integral forwardly projecting tubular shank 142. This shank is long enough to traverse the chambers 36 and 38 and is drilled from its forward end to provide in the plug 136 a blind bore 144, which imparts the tubular character to the shank; although, the plug may be otherwise constructed. The wall of the shank is perforated to provide at least one aperture 146 that opens radially inwardly to the blind bore 144. Thus, as long as the plug 136 is in place as shown in Fig. 2, the chambers 36 and 38 will be in communication. As already explained, the chamber 36 is in permanent communication with the motor outlets 50 and 56 respectively for one end of the remote motor 74 and the end of the integral or rockshaft motor 60.

The housing 12 carries, in addition to the first means or plug 136, a second readily removable means which will be hereinafter referred to as a selector valve designated generally by the numeral 148.

The selector valve comprises an elongated outer member 150 having a forward portion 152 provided with an external smooth cylindrical surface so that the forward portion is axially receivable by and removable from the bore 40 that intersects the upper front and rear chambers 32 and 34. The entire member 150 may be considered as being tubular, having a forward axial bore 154, an intermediate somewhat larger counterbore 156 and a rear larger bore or counterbore 158, the member 150 having an enlarged rear end portion 160 to accommodate the bore 158. The portion 160 is normally exposed beyond the rear face 20 of the housing 12 and an adjacent annular portion of slightly reduced diameter, shown at 162, closes the opening 42 of the bore 40. The selector valve 148, as well as the plug 136, may be removably retained in place in any appropriate manner, such as by detent mechanism forming the subject matter of U. S. Patent 2,578,542. In the case of the selector valve 148 shown here, a detent-receiving notch is visible at 164, but these details are of no importance.

The rear portion of the intermediate counterbore 156 is coaxially threaded at 166 and the enlarged rear end portion 160 is internally threaded at 168. The wall of the tubular shank 152 is perforated by at least one radial aperture 170 at a point just rearwardly of the junction between the bore 154 and the counterbore 156. This aperture, when the selector valve 148 is in place, registers with the rear upper chamber 34 and establishes communication between that chamber and the interior of the selector valve. The junction of the bore 154 and counterbore 156 provides an annular coaxial valve seat 172 just ahead of the aperture 170.

As stated above, the selector valve 148 has the detent notch 164, it being understood that the plug 136 has a similar detent notch (not shown). Representative external means for releasing these detents appears in Fig. 1 and is identified by the numeral 174.

The selector valve 148 includes, in addition to the outer member 150, an inner valve member 176 having its forward portion formed with an annular valve head 178 that cooperates with the valve seat 172 to establish and interrupt communication between the aperture 170 and the bore 154. Just behind the valve head 178, the valve member 176 carries annular seal means 180, which may be of any conventional type and which function to prevent the loss of fluid in a rearward direction. The intermediate portion of the valve member 176 is externally threaded at 182 and these threads and those at 166 previously described serve as means to carry the valve member 176 internally in the outer selector valve member 150. The valve member is elongated and extends rearwardly beyond the threaded portion 182 and has a rear head 184 that normally projects rearwardly beyond the enlarged rear portion 160 of the outer selector valve member 150. A closure or cap 186 has a reduced forward end externally threaded at 188 to be received by the internal threads 168 in the enlarged portion 160 of the member 150. The cap is recessed to normally accommodate the head 184 of the valve member 176 and when the cap is in place, the head 184 is enclosed. When the cap is removed, access may be had to the head 184 from the rear of the housing 12 to enable manual adjustment of the valve member 176 by rotation thereof in one direction or the other selectively to seat the valve head 178 on or to unseat that valve head from the valve seat 172 at the junction of the bore 154 and counterbore 156.

In order that Fig. 1 may be better oriented with respect to Figs. 2 and 3, the reference numerals 190 and 192 have been used to designate upper and lower check valve chamber plugs.

When the tractor is used with remote or trail-behind implements, the remote motor 74 is connected to the hydraulic system by means of the hose lines 86 and 88 and by the additional means of auxiliary hose lines 194 and 196. The forward ends of the lines 194 and 196 are connected respectively to the motor outlet fittings 54 and 52 and the rear ends of these lines are connected to the forward ends of the lines 86 and 88 by a dual coupling assembly, designated generally by the numeral 198. This coupling requires no detailed description, since it does not by itself form any part of the present invention. The coupling illustrated may be substantially like that in the U. S. patent to Merriman 2,538,259, one of the characteristics of which is that the coupling as a unit is supported on the tractor, as by means of a bracket 200, so that tensional forces on the hoses 86 and 88 have their effect only on the coupling assembly 198 and not on the hoses 194 and 196. The couplings contained in the assembly 198 are of the breakaway and self-sealing type. These couplings may be simultaneously released manually by trigger mechanism (not shown) controlled by a small lever 202. In the event o faccidental disconnection of the implement from the tractor, the tensional forces imposed on the hoses 86 and 88 will, when they reach a predetermined maximum, cause automatic separation of the couplings in the unit 198. As previously explained, one of the important features of the present invention is to adapt the hydraulic system to the use of the newer type couplings as represented by the unit 198. As will have been seen, this adaptation is made possible by the utilization of the motor outlet fittings 52 and 54, together with the secondary or auxiliary hoses 194 and 196, making possible the utilization of a coupling such as that shown at 198 without resorting to any major changes in the basic hydraulic system. Stated otherwise, the hoses 194 and 196 are, together with the forward half of the coupling unit 198, considered as being part of the tractor, and the rear half of the coupling unit 198, when separated from its complementary front half, is considered part of the remote motor assembly.

Use and operation

It will first be assumed that the system is being utilized solely with the motor 60 and that the remote motor 74 has been intentionally disconnected at the coupling 198. In this case, the selector valve 148 is open, meaning that the internal valve member 176 has been unscrewed to an extent unseating its valve head 178 from the internal valve seat 172 and thus establishing communication between the chambers 34 and 32 via the bore 154 in the selector valve. Regardless of which motor is to be controlled by the main control valve 30, no change is made in the plug 136. Consequently, the lower chambers 38 and 36 are always in communication with each other and the front lower chamber 36 is permanently in communication with the motor 60 via the motor outlet 56 and motor passage 58.

Since the individual couplings in the coupling unit 198 are of the self-sealing type, disconnection of the coupling to permit removal of the hose lines 86 and 88 results in sealing off the rear ends of the auxiliary hoses 194 and 196. Consequently, the operation is confined to the integral or rockshaft motor 60. If the main control valve 30 is moved upwardly, the pressure inlet 26 is connected to the check valve passage 124, the high-pressure ring 106 closing the valve bore 28 above the high-pressure groove 100 and the lower ring 110 closing the valve bore 28 against escape of fluid to the lower reservoir groove 92. With the inlet 26 connected to the check valve passage 124, fluid-pressure rise causes opening of the check valve 128 and fluid flows through the check valve chamber 126 and thence through the line 130 to the lower rear chamber 38 and from there through the opening 146 in the plug 136 and out through the forwardly directed bore 144 in the plug to transmit fluid under pressure via the motor outlet 56 and motor passage or line 58 to the front or right-hand end of the cylinder 62 of the motor 60. Thus, the piston 64 is moved to the rear and effects clockwise rocking of the rockshaft 72. Direct-attached implements connected to the rockshaft 72 will thereupon be raised. Although raising movement of the main control valve 30 causes the tapered portion 112 to open the upper check valve 120, the circuit is not affected, since the chamber 132 is connected at one side to the reservoir 94 by the line 134 and is connected at its other side to the chamber 34 via the open selector valve 148.

The main control valve 30 is moved downwardly to effect counterclockwise rotation of the rockshaft 70, which follows from retraction of the motor 60 as the piston 64 moves to the right in the cylinder 62. When the valve 30 is thus moved downwardly, the lower tapered portion 114 positively opens the lower check valve 128 and fluid returning from the right-hand end of the cylinder 62 travels through the line 58, through the motor outlet 56, chamber 36, plug bore 144, plug opening 146 and line 130 from the chamber 38 to the lower check valve chamber 126, whence the fluid flows through the check valve passage 124 and along the main control valve bore 28 to the lower reservoir groove 92 and out the reservoir line 98 to the reservoir 94. Although downward positioning of the main control valve 30 results in establishing communication between the inlet 26 and the upper check valve passage 116, the only result is that the check valve 120 will open and fluid will circulate from the upper check valve chamber 118 via the line 122 to the upper rear chamber 34 and through the opening 170 and bore 154 in the selector valve to the upper front chamber 32 and thence to the reservoir 94 via the passage 132 and line 134. Hence, regardless of the use of the plug 136 and the selector valve 148, the basic single-acting system is not affected and functions as before, which is significant from the standpoint of evidencing the fact that only a few changes need be made in the system to adapt it, according to the invention, for use with breakaway and self-sealing couplings of the type shown generally at 198.

When it is desired to use the hydraulic power control in conjunction with the remote motor 74, only a simple change in the system is required. This may be accomplished by closing the selector valve 148. This is done following removal of the cap 186, which exposes the head 184 of the inner valve member 176 to the operator, who thereupon screws the member 176 in until the valve head 178 seats on the internal valve seat 172. The result is that fluid communication through the bore 154 is cut off. The seal at the valve seat 172 via the valve head 178 in conjunction with the permanent seal 180 prevents the escape of fluid in either direction along the selector valve.

The remote cylinder hoses 86 and 88 are then connected to the coupling 198 and the system is ready for remote motor operation.

The remote motor may be extended (its piston 78 moved to the left) by the supplying of fluid under pressure to the right-hand end of the cylinder 76 via the interconnected hose lines 86 and 194. The line 194 is connected by the fitting 54 to the lower motor outlet 50 and this outlet in turn is permanently connected to the lower front chamber 36. Hence, when the main control valve 30 is moved upwardly, the fluid pressure inlet 26 is connected to the lower check valve passage 124. Fluid-pressure rise causes opening of the check valve 128 so that fluid under pressure flows through the check valve chamber 126 to the lower rear chamber 38 via the line 130. From the chamber 38, the fluid is transmitted via the plug opening 146 and plug bore 144 to the chamber 36 and thence to the right-hand end of the motor 74 by the passages and lines previously described. As the valve 30 is moved upwardly, its upper tapered portion 112 positively opens the upper check valve 120. Fluid returning from the left-hand end of the motor 74 does so through the hose lines 88 and 196, entering the upper motor outlet 48 and flowing from there into the upper rear chamber 34. Since this chamber surrounds the shank 152 of the selector valve, and since the closed valve at 172—178 blocks off communication between the chambers 34 and 32, the returning fluid must travel through the return line 122 to the upper check valve chamber 118 and thence via the upper check valve passage 116, valve bore 28, upper reservoir groove 90 and upper reservoir line 96 to the reservoir 94.

It will be noted that the transmission of fluid under pressure via the lower line 130 and lower set of chambers 38 and 36 will result in the transmission of fluid through the rockshaft motor outlet 56 in parallel with the remote motor outlet 50. However, this is immaterial, since normally no implements will be connected to the rockshaft 70 and once the motor 60 is extended to rotate the rockshaft 70 in a clockwise direction to raise the lift arm 72, the arm may be locked in its upper position so that it does not repeat the cycle just described. This result is possible because the motor 60 is single-acting and can retract only under the influence of some external force, such as a downward force directed against the lift arm 72. Once the motor 60 has been extended, it is idle, therefore, and may be considered isolated from the control and operation of the double-acting motor 74.

When the main control valve 30 is moved downwardly, the remote motor 74 is forcibly retracted by the transmission of fluid under pressure from the supply inlet 26 via the upper check valve passage 116, upper check valve chamber 118, line 122, chamber 34, upper remote motor port 48 and hose lines 196 and 88. Since the selector valve 148 is closed, the chamber 32 is isolated from the chamber 34 and there can be no escape of fluid to the reservoir via the line 134. Fluid returning from the retracting remote motor 74 does so through the hose lines 86 and 194, entering the lower remote motor outlet 50 to travel thence to the return line 130 via the plug-connected chambers 36 and 38. Since downward movement of the main control valve 30 positively opens the lower check valve 128, the circuit is completed from the lower check valve chamber 126 to the reservoir 94 via the lower check valve passage 124, valve bore 28, lower reservoir groove 92 and line 98.

In addition to the above, the system may be used with a single-acting motor substituted for the double-acting motor 74, in which case the fluid-receiving end of the single-acting motor would be connected to either of the hose lines 86 or 88.

Various specific features of the invention not categorically enumerated herein will undoubtedly occur to those versed in the art, as likewise will many modifications and alterations in the preferred embodiment of the invention disclosed, all of which may be achieved without departing from the spirit and scope of the invention. In this respect, it should be observed that the use, in the specification as well as in the claims, of such terms as "front," "rear," etc. is for the purposes of convenience only and is not intended to engraft upon the invention any needless limitations.

What is claimed is:

1. In a tractor hydraulic power lift system of the type including a single-acting motor and a double-acting motor: means for selectively operating the motors, comprising a control valve housing having a top and bottom and front and rear and opposite sides, a fluid-pressure inlet, upper front and rear chambers intersected by an upper fore-and-aft bore opening at the rear of the housing, lower front and rear chambers intersected by a lower fore-and-aft bore opening at the rear of the housing, first and second motor outlets opening at one side of the housing for connection to the double-acting motor and connected respectively to the upper rear and lower front chambers, a third motor outlet opening at another side of the housing for connection to the single-acting motor and connected to the lower front chamber, a reservoir outlet connected to the upper front chamber, and control valve means and passages for selectively connecting the rear chambers alternately to the inlet and to a reservoir; first removable means received in and closing the rear end of the lower bore and leaving the lower chambers in communication via said lower bore; and second removable means carried by the housing in the upper bore and including relatively adjustable elements for selectively establishing and disconnecting communication between the upper chambers via said upper bore.

2. The invention defined in claim 1, in which: one of the second means elements is a tubular member coaxially received in the lower bore and closed at its rear end and opening at its front end to the upper front chamber and having a perforated wall in register with the upper rear chamber; and the other of said second means elements is a movable member carried by the tubular member for selective positioning to establish and interrupt communication between said perforated wall and said open front end of the tubular member.

3. The invention defined in claim 2, in which: the rear end of the tubular member extends at the rear of the housing and is closed by a removable closure; and the movable member has a rear end portion normally inclosed by said closure and available for manual operation at the rear of the housing when said closure is removed.

4. The invention defined in claim 2, in which: the interior of the tubular member has an internal annular valve seat forwardly of the perforated wall portion and concentric with the axis of said member; and the movable member is axially movable in the tubular member and has at its front end an annular valve head selectively seatable on and unseatable from said seat.

5. The invention defined in claim 4, in which: the interior of the tubular member is in the form of a rear bore and a forward, smaller counterbore and the valve seat is formed at the junction of said bore and counterbore.

6. The invention defined in claim 1, in which: one of the second means elements is a tubular member coaxially received in the lower bore and opening at its front end to the upper front chamber and opening at its rear end at the rear of the housing, said tubular member having its wall perforated in register with the upper rear chamber and including a coaxial annular valve seat forwardly of said perforated wall portion and said tubular member being coxially internally threaded rearwardly of said perforated wall portion; and the other of said second means elements comprising an externally threaded valve member carried by the internal threads of the tubular member and having a forward end provided with an annular valve head cooperative with the valve seat and further having at its rear end means to receive manual rotative force for moving said valve member axially to seat and unseat the valve head.

7. The invention defined in claim 6, in which: the tubular member has an integral coaxially hollow rear end outside the housing and of a diameter greater than that of the portion of the tubular member within the housing so as to encircle the rear end of the valve member, said hollow rear end is coaxially threaded; and a threaded closure cap is removably carried by said hollow rear end.

8. In a tractor hydraulic power lift system of the type including a pair of motors: means for selectively operating the motors, comprising a control valve housing having a top and bottom and front and rear and opposite sides, a fluid-pressure inlet, upper front and rear chambers intersected by an upper fore-and-aft bore opening at the rear of the housing, lower front and rear chambers intersected by a lower fore-and-aft bore opening at the rear of the housing, a first motor outlet opening to the outside of the housing for connection to one motor and connected to the upper rear chamber, a second motor outlet opening to the outside of the housing for connection to the other motor and connected to the lower front chamber, a reservoir outlet connected to the upper front chamber, and control valve means and passages for selectively connecting the rear chambers alternately to the inlet and to a reservoir; first removable means received in and closing the rear end of the lower bore and leaving the lower chambers in communication via said lower bore; and second removable means carried by the housing in the upper bore and including relatively adjustable elements for selectively establishing and disconnecting communication between the upper chambers via said upper bore.

9. For use with a hydraulic system of the type having a housing including an axially opening passage intersected by a transverse passage; a selector valve comprising an elongated outer member having a forward cylindrical portion axially insertable in and withdrawable from the cylindrical passage and itself being formed with an axial bore and a larger counterbore and further having an integral coaxial enlarged rear portion formed with a communicating bore coaxially rearwardly of and larger than the counterbore, the junction of the forward bore and counterbore providing an internal annular valve seat and the forward portion having an aperture radially therethrough to the rear of the valve seat and ahead of the junction of the counterbore and the rear bore for register with the aforesaid intersecting passage, a rear portion of the counterbore being threaded; an internal valve member coaxially within the outer member and having a front cylindrical shank part concentrically received in the counterbore and formed with a forward valve head cooperative with the valve seat, a threaded intermediate portion engaging the threaded portion of the counterbore, a rear portion joined to the threaded portion and projecting into and loosely encircled by the rear bore, and a rear extension on said rear portion of the internal valve member and projecting axially rearwardly beyond the rear portion of the outer member to receive an external force effective to accomplish adjustment of the valve head relative to the valve seat; an annular fluid seal encircling the shank part and cooperative with the counterbore axially intermediate the aforesaid aperture and the threaded rear portion of the counterbore; and a closure member removably carried by the rear portion of the outer member for normally closing the rear bore and enclosing the rear extension of the internal valve member.

10. In a tractor hydraulic power lift system of the type including a pair of motors: means for selectively operating the motors, comprising a control valve housing having a top and bottom and front and rear and opposite sides, a fluid-pressure inlet, an upper fore-and-aft bore opening at the rear of the housing and including an intermediate communicating chamber, a lower fore-and-aft bore opening at the rear of the housing and including an intermediate communicating chamber, a first motor outlet opening to the outside of the housing for connection to one motor and connected to the upper chamber, a second motor outlet opening to the outside of the housing for connection to the other motor and connected to the lower chamber, a reservoir outlet connected to the upper bore forwardly of the upper chamber, and control valve means and passages for selectively connecting the upper and lower chambers alternately to the inlet and to a reservoir; first movable means received in and closing the rear end of the lower bore and leaving the lower chamber in communication with the forward portion of said lower bore; and second removable means carried by the housing in the upper bore and including relatively adjustable elements for selectively establishing and disestablishing communication between the upper chamber and the forward part of said upper bore.

References Cited in the file of this patent

UNITED STATES PATENTS

| | | |
|---|---|---|
| 1,621,738 | Motherwell | Mar. 22, 1927 |
| 1,634,628 | Replogle | July 5, 1927 |
| 2,360,733 | Smith | Oct. 17, 1944 |
| 2,532,552 | Jirsa et al. | Dec. 5, 1950 |
| 2,533,466 | Jirsa et al. | Dec. 12, 1950 |